United States Patent [19]

Darbyshire et al.

[11] Patent Number: 4,579,739
[45] Date of Patent: Apr. 1, 1986

[54] PROCESS FOR THE MANUFACTURE OF A NATURALLY CARBONATED BEVERAGE

[75] Inventors: John Darbyshire; Jaroslav Dasek; Hugh Hose, all of Yverdon, Switzerland

[73] Assignee: Nestec S. A., Vevey, Switzerland

[21] Appl. No.: 561,044

[22] Filed: Dec. 13, 1983

[30] Foreign Application Priority Data

Jan. 13, 1983 [CH] Switzerland .......................... 162/83

[51] Int. Cl.$^4$ .......................... C12G 1/00; C12G 3/00; A23L 2/26
[52] U.S. Cl. .......................................... 426/13; 426/15; 426/52; 435/42; 435/853; 435/856; 435/942; 435/943
[58] Field of Search ............... 426/13, 15, 52; 435/42, 435/853, 856, 942, 943

[56] References Cited

PUBLICATIONS

Wood–Spec. Publ. Soc. Gen. Microbiol., (1981) pp. 137–141.
Wood–Chem. Abst., vol. 96 (1982) p. 179,487w.

*Primary Examiner*—Sam Rosen
*Attorney, Agent, or Firm*—Vogt and O'Donnell

[57] ABSTRACT

A must is fermented with a combination of at least one yeast and at least one lactobacillus, the former being selected from the group of *Saccharomyces cerevisiae* and *Kluyveromyces lactis* and the latter being selected from the group of *Lactobacillus casei* and *Lactobacillus hilgardii* for their symbiotic ability and capability to produce a synergistic organoleptic effect which eliminates all after-taste of yeast. The must is inoculated such that the respective numbers of yeast germs and lactobacilli germs per ml have a ratio of from 1:10 to 1:500.

10 Claims, No Drawings

PROCESS FOR THE MANUFACTURE OF A NATURALLY CARBONATED BEVERAGE

The present invention relates to a process for the manufacture of a beverage which has been naturally carbonated by fermenting a must with a yeast.

For some time now it has been known to produce many beverages by fermenting various fermentable aqueous liquids, such as fruit juices, cereal extracts, milk or whey. Throughout the world different civilisations have been aware, or are now aware, of the use of fermented beverages. The type of microorganisms which are used depends on the nature of the substrate. A yeast is used for certain beverages, particularly alcoholic beverages such as wine and beer, whereas a combination of yeasts and lactobacilli may be used for others, such as for the manufacture of kefir beverage from mare's milk. Furthermore proposals have been made for the manufacture of refreshing dietetic beverage by fermenting whey with a mixture of yoghurt cultures and kefir cultures.

Likewise suggestions have been made for the manufacture of naturally carbonated "table beverages" by slightly fermenting fruit juices with selected yeasts rather than by injecting carbon dioxide into these juices.

Each of the above-mentioned beverages has advantages and disadvantages. Wine and beer, for example, may be criticized for having too high an alcohol content and beverages which are produced using milk may be criticized for being excessively rich and having too high a viscosity. Beverages produced from whey are very stereotyped and not necessarily to everyone's liking. Finally, opinions are somewhat divided on the organoleptic qualities of fruit juices which have been carbonated by slightly fermenting them using single yeasts. On the one hand it is very difficult to avoid an after-taste of yeast and on the other hand the flavour and natural acidity of the fruit juice is lost.

An object of this invention is to provide a reliable controllable reproducible process for the industrial manufacture of a table beverage which has been naturally carbonated by fermentation, an operation which enhances the original flavour of the fruit juices yet leaves not the slightest after-taste of yeast nor reduces the natural acidity of the juices.

To this end, the process according to the present invention is characterised in that a must is fermented with a combination of at least one yeast and at least one lactobacillus, the former being selected from the group of *Saccharomyces cerevisiae* and *Kluyveromyces lactis* and the latter being selected from the group of *Lactobacillus casei* and *Lactobacillus hilgardii*, for their symbiotic ability and capability to produce a synergistic organoleptic effect which eliminates all after-taste of yeast, the must being inoculated such that the respective numbers of yeast germs and lactobacillus germs per ml are in a ratio of from 1:10 to 1:500. Preferably the must is inoculated with from 0.01 to 5% by volume of an inoculum of yeast containing from $10^7$ to $10^{10}$ living microorganisms or germs per ml and from 0.01 to 5% by volume of an inoculum of lactobacillus containing from $10^8$ to $10^{10}$ living microorganisms or germs per ml.

In this specification the term "must" is to be understood in general as designating an aqueous solution of fermentable sugar which also contains natural elements, in particular assimilable nitrogen, which are necessary for the growth and activity of the yeasts. The must may therefore be a fruit juice, a vegetable juice, an extract from the seeds, roots or leaves of plants, or sugared water to which for example a fruit juice concentrate has been added.

Thus a process has been found for the industrial manufacture of a naturally carbonated beverage which has the desired organoleptic qualities and it has even been found that the intensity of taste and aroma may be delicately altered in a reproducible manner, by modifying the ratio of yeast germs to lactobacillus germs, within the specified limits.

To carry out the present process a must which has at the outset a certain acidity and contains the growth factors necessary both for the growth and activity of the lactobacilli is preferably used as the starting material in the fermentation operation.

A must is preferably used in which the ratio of the respective numbers of yeast germs and lactobacillus germs per ml remains substantially constant during fermentation. Thus, in a preferred embodiment of the present process a must is fermented which contains from 1 to 15% by weight of sucrose, from 0.1 to 5% by weight of a fruit juice concentrate and from 0.01 to 0.05% by weight of a growth factor such as a yeast extract, a malt extract or a protein hydrolysate. Bearing in mind that on the one hand the yeasts show hardly any signs of growth under anaerobic conditions, that their growth is therefore substantially halted when they have consumed the oxygen dissolved in the must, and that on the other hand the lactobacilli cannot grow without a growth factor and that finally the anaerobic production of $CO_2$ by the yeast is accompanied by the production of a substantially equal quantity by weight of alcohol, a composition may be chosen within these limits which would enable the precise desired organoleptic qualities to be obtained in the end product.

The fermentation time of the must depends, among other things, on the yeast which is used and the level of alcohol which is not to be exceeded in the end product. This level is preferably less than about 0.5% for naturally carbonated refreshing table beverages which are not to be regarded as alcoholic drinks. At a fermentation temperature of 30° C. or thereabouts, a temperature which is particularly favourable for the present combination of yeasts and lactobacilli, a period of 12 h is required to reach this alcohol limit of 0.5% in the must if *Kluyveromyces lactis* is used and a period of about 24 h if *Saccharomyces cerevisiae* is used in initial concentrations of about $10^5$ germs per ml of must. Higher fermentation temperatures may also be used, for example up to about 40° C., the result being that the action of the yeast is encouraged while the action of the lactobacilli is discouraged, and this gives the fermented must a more pronounced flavour. A lower fermentation temperature, for example down to 20° C., may also be used, the result of which amounts to nothing more than a slowing down of the fermentation process. In general at a fermentation temperature of from 20° to 40° C. and for a final alcohol content of less than 0.5%, the fermentation time is normally from 6 to 48 hours.

As for pressure, the must is preferably fermented under the pressure created by the $CO_2$ released during fermentation. This pressure may for example reach from 2 to 4 bars at the point when fermentation is stopped once the alcohol content of the must has reached a moderate level, one which does not give the beverage the nature of an alcoholic drink.

As indicated above, fermentation is preferably initiated at an acid pH which immediately encourages the action of the yeasts and lactobacilli, that is a pH of about 4 to 5. An initial pH of slightly below 4 may also be used but a slowing down of fermentation becomes inevitable as a result of this. This initial slightly acid pH may be obtained by adding for example a fruit juice concentrate to the must, in particular a citrus concentrate. Concentrates which are available on the market are normally obtained by concentrating a natural juice by 3 to 6 times. A fraction of a percent of lemon concentrate or several percent of orange juice concentrate for example, may thus give the must the desired inital pH. This pH is reduced even further during the course of fermentation and may thus be reduced to a final pH value which is comparable to the pH value of a natural fruit juice such as orange or grapefruit.

To stop the fermentation operation, the liquid may be for example abruptly cooled to a temperature of from 5° to 10° C. and the biomass may be rapidly separated from the fermented must. This separation may be carried out either by filtration or centrifugation. The concentration of yeast germs in the must may be reduced 1,000 times and this suffices to temporarily halt the continued production of $CO_2$ and alcohol and to avoid the possibility of unpleasant flavours developing by autolysis. Finally by continuing this mechanical separation until the lactobacilli are removed, using for example appropriate centrifugation and filtration techniques, a perfectly clear beverage may be produced if so wished.

Depending on the must which is used, the end product may be obtained by adding for example a fruit juice and/or flavouring to the fermented must. This method makes the process more flexible, because it means that only one fermented base need be prepared which may then be used for the manufacture of beverages which have subtle differences in flavour and aroma or are of different types. A lemon juice concentrate is preferably used for the preparation of a base such as is mentioned above, because the lemon gives the base the refreshing, acidic quality which is desired without giving it a stereotyped flavour.

The beverage is then preferably bottled and pasteurised. Pasteurisation may be carried out under conventional conditions, ranging from 20 to 40 mins at 65° C. to 1 to 3 mins at 80° C.

When selecting the microorganisms required for the present process, tests should be carried out with different strains of the above mentioned species, using at least one yeast with at least one lactobacillus. Within the framework of the present process, numerous tests have been carried out on dozens, if not hundreds, of microorganisms of various origins.

Particularly good results were achieved by using at least one of the two strains of yeast namely *Saccharomyces cerevisiae* NCYC 1439 and *Kluyveromyces lactis* NCYC 1440 which were deposited on Dec. 17, 1982 at the National Collection of Yeast Cultures (NCYC) in Great Britain, combined with at least one of the six strains of lactobacillus namely *Lactobacillus (L.) hilgardii* NCIB 11818 and NCIB 11819 and *L. Casei* NCIB 11814 to NCIB 11817 which were deposited on Dec. 20, 1982 at the National Collection of Industrial Bacteria (NCIB) in Great Britain.

The following Examples are provided by way of illustration. The percentages are expressed in weight, unless otherwise indicated.

EXAMPLE 1

A must having a pH of 4.0 is prepared by dissolving in water 0.3% of a lemon juice concentrate, 0.1% of powdered yeast extract and 2% of sucrose. This must is pasteurised for 2 minutes at 80° C. and is poured into a 1000 ml fermenter which has been previously sterilized. The temperature of the must is raised to 26° C. and it is injected with 0.02% by volume of a *Saccharomyces cerevisiae* NCYC 1439 culture containing $2 \times 10^9$ of germs per ml and 0.6% by volume of a *Lactobacillus casei* NCIB 11817 culture containing $4 \times 10^9$ of germs per ml. The original respective numbers of yeast germs and the lactobacillus germs in the must are therefore $4 \times 10^5$ and $2.4 \times 10^7$ per ml and their ratio is 1:60. Fermentation is carried out at 26° C. under the pressure created by the release of $CO_2$ into the must, a pressure level which reaches about 3 bars when the process is stopped, that is after about 18 h, once the concentration of alcohol which is produced in the must has almost reached 0.5%. Fermentation is stopped by cooling the fermenter to 5° C. Throughout the fermentation operation, the must is slightly agitated to keep the germs in suspension, to ensure that the must is homogeneous and to prevent temperature gradients developing.

The germs are then separated from the fermented must by centrifugation under pressure and a colourless, clear, naturally carbonated fermented beverage base is obtained which may be consumed in its present form or after flavourings have been added to produce a pleasantly refreshing beverage which does not have even the slightest after-taste of yeast. If it is drunk before flavouring has been added, the beverage has a relatively bland taste.

Several batches of flavoured beverages may be obtained by adding to the base liquid either a fruit juice, in particular one part of orange juice to 10 parts of base, or a fruit concentrate, in particular grapefruit, apple and pineapple concentrates, or flavourings such as tea and cola. A unique refreshing beverage is obtained each having flavour which is enhanced by the organoleptic qualities of the base.

EXAMPLE 2

A must having a pH of 4.8 is prepared by dissolving in water 2% of an orange juice concentrate, 0.1% of yeast extract having a dry matter content of 80% and 2% of sucrose. After it has been pasteurised and poured into the fermenter, the must is inoculated with 3% by volume of a suspension of *Kluyveromyces lactis* NCYC 1440 in a solution of isotonic sucrose containing $5 \times 10^7$ of germs per ml and 3% by volume of a suspension of *Lactobacillus hilgardii* NCIB 11819 in an isotonic solution of sucrose containing $10^9$ of germs per ml. The original respective numbers of yeast germs and lactobacillus germs in the must are therefore $1.5 \times 10^6$ and $3 \times 10^7$ and their ratio is 1:20. Fermentation is carried out at 30° C. for 6 h. The must is cooled, the germs are separated from the fermented must and a naturally sparkling beverage is obtained which has organoleptic qualities similar to those of the beverage base, the production of which is described in Example 1, but which has an orange flavour and a more pronounced taste. The beverage is bottled and pasteurised.

EXAMPLES 3 TO 6

Four beverages are prepared as described in Examples 1 and 2, although the ingredients, inocula and the conditions are slightly modified as shown in the following Table.

| Ex. No. | Strain | Inoculum Volume % vol | Inoculum Concentration germs/ml | Composition of must % by weight | Must germs/ml | Must Ratio S:L | Must original pH | Fermentation temperature | Fermentation time |
|---|---|---|---|---|---|---|---|---|---|
| 3 | S. cerevisiae NCYC 1439 | 0.1 | $1.1 \times 10^8$ | sucrose 1% yeast extract 0.1% | S. $1.1 \times 10^5$ | 1:20 | 4.5 | 30° C. | 24 h |
|   | L. casei NCIB 11815 | 0.4 | $5.5 \times 10^8$ | grapefruit concentrate 1% | L. $2.2 \times 10^6$ |  |  |  |  |
| 4 | S. cerevisiae NCYC 1439 | 0.1 | $1.3 \times 10^8$ | sucrose 10% malt extract 0.03% | S. $1.3 \times 10^5$ | 1:55 | 4.5 | 35° C. | 15 h |
|   | L. casei NCIB 11814 | 0.4 | $1.8 \times 10^9$ | grapefruit concentrate 1% | L. $7.2 \times 10^6$ |  |  |  |  |
| 5 | S. cerevisiae NCYC 1439 | 0.1 | $9 \times 10^7$ | sucrose 2% lemon concentrate 1% | S. $9 \times 10^4$ | 1:200 | 4.2 | 30° C. | 24 h |
|   | L. casei NCIB 11817 | 0.4 | $4.5 \times 10^9$ | protein hydrolysate 0.1% | L. $1.8 \times 10^7$ |  |  |  |  |
| 6 | S. cerevisiae NCYC 1439 | 0.3 | $1.5 \times 10^7$ | sucrose 2% lemon concentrate 0.2% | S. $5 \times 10^4$ | 1:50:50 | 4.2 | 25° C. | 36 h |
|   | L. casei NCIB 11816 | 0.3 | $7.5 \times 10^8$ | protein hydrolysate 0.1% | L. $2.5 \times 10^6$ |  |  |  |  |
|   | L. hilgardii NCIB 11818 | 0.3 | $7.5 \times 10^8$ |  | L. $2.5 \times 10^6$ |  |  |  |  |

Four naturally sparkling, refreshing beverages which have excellent organoleptic qualities, that is to say they do not have a yeast after-taste but a pronounced fruity note characteristic of grapefruit in Examples 3 and 4 and a relatively neutral note in Examples 5 and 6. The taste of the beverage in Examples 4 and 6 is pronounced taste, and the taste of the beverage in Example 3 is even more so, whereas that of the beverage in Example 5 is particularly subtle and delicate. The beverage in Example 3 is not at all sweet, as all the sugar has been converted into $CO_2$ and alcohol, whereas the beverage in Example 4 is very sweet.

The beverages are bottled under carbon dioxide pressure and pasteurised. They may be stored during 6 months at 4°, 20° and 30° C.

N.B. All strains identified in this specification have been deposited at the respective collection in accordance with the Budapest Treaty.

We claim:

1. A process for the manufacture of a naturally carbonated beverage comprising fermenting a must with a combination of at least one yeast and at least one lactobacillus, the former being selected from the group consisting of *Saccharomyces cerevisiae* and *Kluyveromyces lactis* and the latter being selected from the group consisting of *Lactobacillus casei* and *Lactobacillus hilgardii*, the must being innoculated such that the respective numbers of yeast germs and lactobacillus germs per ml are in a ratio of from 1:10 to 1:500.

2. A process according to claim 1, wherein the must is inoculated with from 0.01 to 5% by volume of a yeast inoculum containing from $10^7$ to $10^{10}$ germs per ml and from 0.01 to 5% by volume of a lactobacillus inoculum containing from $10^8$ to $10^{10}$ germs per ml.

3. A process according to claim 1, wherein a must is fermented which has a composition such that the ratio of the respective numbers of yeast germs and lactobacillus germs per ml is substantially constant during the fermentation operation.

4. A process according to claim 1, wherein a must is fermented, which contains from 1 to 15% by weight of sucrose, from 0.1 to 5% by weight of a fruit juice concentrate and from 0.01 to 0.5% by weight of a growth factor which is selected from the group constituted by a yeast extract, a malt extract and a protein hydrolysate.

5. A process according to claim 1, wherein the must has an initial pH of between 4 and 5.

6. A process according to claim 1, wherein the must is fermented for from 6 to 48 h at a temperature of from 20° to 40° C. under pressure created by the release of $CO_2$ during fermentation.

7. A process according to claim 1, wherein after fermentation, the germs are separated from the must by filtration or centrifugation.

8. A process according to claim 1, wherein a fruit juice and/or a flavouring are added to the fermented must.

9. A process according to claim 1, wherein the fermented must is pasteurised.

10. A process according to claim 1, wherein the yeast group is constituted by *Saccharomyces cerevisiae* NCYC 1439 and *Kluyveromyces lactis* NCYC 1440, and the lactobacillus group is constituted by *Lactobacillus hilgardii* NCIB 11818, *Lactobacillus hilgardii* NCIB 11819, *Lactobacillus casei* NCIB 11814, *Lactobacillus casei* NCIB 11815, *Lactobacillus casei* NCIB 11816 and *Lactobacillus casei* NCIB 11817.

* * * * *